United States Patent
Choi

(10) Patent No.: US 10,871,599 B2
(45) Date of Patent: *Dec. 22, 2020

(54) CAMERA MODULE AND OPTICAL DEVICE INCLUDING LIQUID LENS

(71) Applicant: LG INNOTEK CO., LTD., Seoul (KR)

(72) Inventor: Yong Bok Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,276

(22) Filed: Jun. 27, 2019

(65) Prior Publication Data
US 2019/0317251 A1 Oct. 17, 2019

Related U.S. Application Data

(63) Continuation of application No. 15/896,659, filed on Feb. 14, 2018, now Pat. No. 10,386,546, which is a
(Continued)

(30) Foreign Application Priority Data

Nov. 2, 2017 (KR) .......................... 10-2017-0145351

(51) Int. Cl.
*G02B 3/14* (2006.01)
*G03B 13/36* (2006.01)
(Continued)

(52) U.S. Cl.
CPC ............. *G02B 3/14* (2013.01); *G02B 27/646* (2013.01); *G03B 13/36* (2013.01); *H04N 5/2253* (2013.01);
(Continued)

(58) Field of Classification Search
CPC ...... G02B 3/14; G02B 27/646; H04N 5/2253; H04N 5/53287
See application file for complete search history.

(56) References Cited

U.S. PATENT DOCUMENTS 9,210,306 B1 12/2015 Gamadia et al.
9,635,232 B2 4/2017 Ryou
(Continued)

FOREIGN PATENT DOCUMENTS

JP 2007-108534 A 4/2007
KR 10-0813211 B1 3/2008
(Continued)

OTHER PUBLICATIONS

Office Action dated Jan. 16, 2018 in Korean Application No. 10-2017-0145351.
(Continued)

*Primary Examiner* — Antoinette T Spinks
(74) *Attorney, Agent, or Firm* — Saliwanchik, Lloyd & Eisenschenk

(57) ABSTRACT

A camera module according to an embodiment includes a liquid lens unit including a cavity, a conductive liquid and a non-conductive liquid disposed in the cavity, "n" individual electrodes (n being an integer of 2 or more), and a common electrode, an interface being formed between the conductive liquid and the non-conductive liquid, a main board including an element constituting a control circuit for controlling the operation of the liquid lens unit, and a holder coupled to the main board such that the open area of an insertion hole for insertion of the liquid lens unit is disposed along a first side of the main board.

20 Claims, 8 Drawing Sheets

Related U.S. Application Data continuation of application No. PCT/KR2017/014746, filed on Dec. 14, 2017.

(51) Int. Cl.
    *H04N 5/232*     (2006.01)
    *H04N 5/225*     (2006.01)
    *G02B 27/64*     (2006.01)

(52) U.S. Cl.
    CPC ....... *H04N 5/2254* (2013.01); *H04N 5/23287* (2013.01)

(56) References Cited

U.S. PATENT DOCUMENTS

| | | |
|---|---|---|
| 9,703,173 B2 | 7/2017 | Brodie et al. |
| 9,880,327 B2 | 1/2018 | Park et al. |
| 10,097,742 B1 | 10/2018 | Moon et al. |
| 2006/0164539 A1 | 7/2006 | Van Arendonk et al. |
| 2008/0266684 A1 | 10/2008 | Chang |
| 2008/0267603 A1 | 10/2008 | Jung et al. |
| 2012/0038815 A1 | 2/2012 | Kato et al. |
| 2012/0236248 A1 | 9/2012 | Kang et al. |
| 2016/0088198 A1 | 3/2016 | An et al. |
| 2017/0315274 A1 | 11/2017 | Park et al. |
| 2018/0095194 A1 | 4/2018 | Park et al. |
| 2018/0367715 A1 | 12/2018 | Moon et al. |

FOREIGN PATENT DOCUMENTS

| | | |
|---|---|---|
| KR | 10-0843473 B1 | 7/2008 |
| KR | 10-2014-0007183 A | 1/2014 |
| KR | 10-2015-0120145 A | 10/2015 |

OTHER PUBLICATIONS

International Search Report in International Application No. PCT/KR2017/014746, filed Dec. 14, 2017.

CAMERA MODULE AND OPTICAL DEVICE INCLUDING LIQUID LENS

CROSS-REFERENCE TO RELATED APPLICATIONS

This application is a continuation of U.S. application Ser. No. 15/896,659, filed Feb. 14, 2018; which is a continuation of International Patent Application No. PCT/KR2017/014746, filed Dec. 14, 2017; which claims priority of Korean Application No. 10-2017-0145351, filed Nov. 2, 2017; the disclosures of each of which are incorporated herein by reference in their entirety.

TECHNICAL FIELD

Embodiments relate to a liquid lens, a camera module, and an optical device. More particularly, embodiments relate to a liquid lens, the focal length of which may be adjusted using electricity, a camera module, and an optical device.

BACKGROUND ART

Users of portable devices have a desire for optical devices that exhibit a high resolution and a small size and have various photographing functions (e.g., optical zoom-in/zoom-out, auto-focusing (AF), and handshaking correction or optical image stabilization (OIS) functions). Although these photographing functions may be implemented by combining several lenses and directly moving the lenses, the size of an optical device may be increased when the number of lenses is increased.

Auto-focusing and handshaking correction functions are implemented by moving or tilting several lens modules, which are fixed to a lens holder and aligned with the optical axis, along the optical axis or in the direction perpendicular to the optical axis, and a separate lens-driving device is used to drive the lens modules. However, the lens-driving device exhibits high power consumption, and a glass cover needs to be separately added to a camera module in order to protect the lens-driving device, thus causing an increase in the overall thickness.

Therefore, studies have been conducted on a liquid lens, which performs auto-focusing and handshaking correction functions by electrically adjusting the curvature of an interface of two types of liquids.

TECHNICAL OBJECT

An object of the embodiments of the subject invention is to provide a camera module and an optical device, which include a liquid lens having an optimum structure so as to increase camera performance.

The technical objects to be accomplished by the embodiments of the subject invention are not limited to the aforementioned technical object, and other unmentioned technical objects will be clearly understood from the following description by those having ordinary skill in the art.

Technical Solution

According to one embodiment, a camera module may include a holder including a first side surface having a first opening and a second side surface having a second opening that faces the first opening in a direction perpendicular to an optical-axis direction (e.g., perpendicular to the optical axis of a lens (e.g., a liquid lens) or lens unit (e.g., a liquid lens unit) of the camera module), a first lens unit disposed in the holder, a second lens unit disposed in the holder, a liquid lens unit disposed between the first lens unit and the second lens unit, at least a portion of the liquid lens unit being disposed in the first opening and the second opening in the holder, and a main board disposed below the holder, a plurality of circuit elements and an image sensor being disposed on the main board, wherein the main board includes a first long side, a second long side opposite the first long side, and a short side disposed between the first long side and the second long side so as to connect the first long side to the second long side (the short side can have a length that is less than that of each of the first long side and the second long side). The first opening can be opened toward the first long side of the main board, and the second opening can be opened toward the second long side of the main board. That is, the holder can be arranged such that a (virtual or imaginary) line extending out from the first opening extends over the first long side of the board and a (virtual or imaginary) line extending out from the second opening extends over the second long side of the board.

In some embodiments, the liquid lens unit may be inserted through at least one of the first opening and the second opening, and a portion of the liquid lens unit may protrude from at least one of the first side surface and the second side surface of the holder.

In some embodiments, the liquid lens unit may have a center thickness smaller than a size of the first opening in the holder with respect to the optical-axis direction (e.g., in a direction parallel to the optical axis of the liquid lens unit).

In some embodiments, the circuit elements may not overlap a virtual plane, which passes through the first opening and the second opening, in the optical-axis direction (e.g., in a direction parallel to the optical axis of the liquid lens unit).

In some embodiments, the liquid lens unit may include a liquid lens, and the liquid lens may include a first plate including a cavity in which a conductive liquid and a non-conductive liquid are disposed, an individual electrode disposed on one surface of the first plate, and a common electrode disposed on another surface of the first plate.

In some embodiments, the liquid lens unit may further include a first connection substrate disposed on the liquid lens and configured to electrically connect the common electrode and the main board to each other, a second connection substrate disposed on the liquid lens and configured to electrically connect the individual electrode and the main board to each other, a first side surface located at the first long side and a second side surface located at the second long side, and the first connection substrate may include a first bending portion, which is connected to the common electrode, bends toward the main board, and is disposed at a position corresponding to a center of the first side surface of the liquid lens unit (e.g., is lined up, in a direction perpendicular to the optical axis and parallel to an upper surface of the main board, with the center of the first side surface of the liquid lens unit).

In some embodiments, the second connection substrate may include a second bending portion, which is connected to the individual electrode, bends toward the main board, and is disposed at a position corresponding to a center of the second side surface of the liquid lens unit (e.g., is lined up, in a direction perpendicular to the optical axis and parallel to an upper surface of the main board, with the center of the second side surface of the liquid lens unit).

In some embodiments, the camera module may further include a first pad portion configured to be electrically connected to the first connection substrate. The first pad portion can be disposed on the main board at a position corresponding to a center of the first side surface of the liquid lens unit (e.g., lined up, in a direction perpendicular to the optical axis and parallel to an upper surface of the main board, with the center of the first side surface of the liquid lens unit), and extending away from the circuit elements (see, e.g., FIG. 4). For example, the first pad portion can include a plurality of pads, one of which is closest to the circuit elements and is also disposed at a position corresponding to the center of the first side surface of the liquid lens unit while the remaining pads are disposed at positions extending farther away from the circuit elements (e.g., the pad that is closest to the pad at the position corresponding to the center of the first side surface of the liquid lens unit is also the second-closest pad to the circuit elements, the pad closest to that pad is the third-closest to the circuit elements, and so on).

In some embodiments, the holder may include a first hole for accommodating the first lens unit therein and a second hole for accommodating the second lens unit therein, the first hole and the second hole overlapping each other in the optical-axis direction (e.g., in a direction parallel to the optical axis of the liquid lens unit).

In some embodiments, the camera module may further include a middle base disposed between the holder and the main board.

In some embodiments, the camera module may further include a sensor base disposed between the middle base and the main board, an infrared light blocking filter being disposed on the sensor base.

In some embodiments, the middle base may include an opening into which a portion of the holder is inserted.

In some embodiments, the holder may include an upper plate, a lower plate, and a first sidewall and a second sidewall for interconnecting the upper plate and the lower plate, and the middle base may have a thickness greater than an outer thickness of the lower plate of the holder.

In some embodiments, the camera module may further include a cover for covering an upper surface and a side surface of the holder, the first connection substrate may be a metal plate, the metal plate may include a lower terminal configured to be electrically connected to the main board and an upper terminal configured to be electrically connected to the liquid lens, and the camera module may further include an insulation material disposed on the metal plate in an area that faces an inner side surface of the cover.

In some embodiments, the insulation material may be disposed so as to extend to an area that is located below the liquid lens.

According to another embodiment, a camera module may include a holder including a first side surface having a first opening and a second side surface having a second opening, the second opening facing the first opening in a direction perpendicular to an optical-axis direction (e.g., perpendicular to the optical axis of a lens (e.g., a liquid lens) or lens unit (e.g., a liquid lens unit) of the camera module), a first lens unit disposed in the holder, a second lens unit disposed in the holder, a liquid lens unit disposed between the first lens unit and the second lens unit, at least a portion of the liquid lens unit being disposed in the first opening and the second opening in the holder, a main board disposed below the holder, a plurality of circuit elements and an image sensor being disposed on the main board, and a middle base disposed between the liquid lens unit and the main board, a portion of the holder being inserted into the middle base.

In some embodiments, the camera module may further include a sensor base disposed between the middle base and the main board, an infrared light blocking filter being disposed on the sensor base.

In some embodiments, the middle base may have a length greater than a length of the holder in a direction from the first opening to the second opening. According to a further embodiment, an optical device includes the camera module, a display unit for outputting an image, a battery for supplying power to the camera module, and a housing in which the camera module, the display unit, and the battery are mounted.

Aspects described above are merely some of the embodiments, and various embodiments in which technical features of the disclosure are reflected may be derived and understood based on the following detailed description of the embodiments by those skilled in the art.

Advantageous Effects

The effects of a device according to the embodiments will be described as follows.

With a camera module and an optical device including a liquid lens, according to an embodiment, there is no or minimal risk of damage to elements on a main board during implementation of active alignment, and second alignment may be appropriately completed. In addition, it is possible to reduce the difficulty of a process of soldering each connection substrate to a main board and to prevent or inhibit the occurrence of damage to elements.

In addition, by minimizing a floating or deformation phenomenon due to the stress of an adhesive between a liquid lens and a holder, it is possible to increase the performance of a camera module.

In addition, it is possible to enable a jig to stably perform gripping by mounting a middle base having a sufficient thickness to a holder upon the implementation of active alignment.

The effects acquired by the embodiments are not limited to the effects mentioned above, and other unmentioned effects will be clearly understood by those skilled in the art from the following description.

BEST MODE

Figure 1:
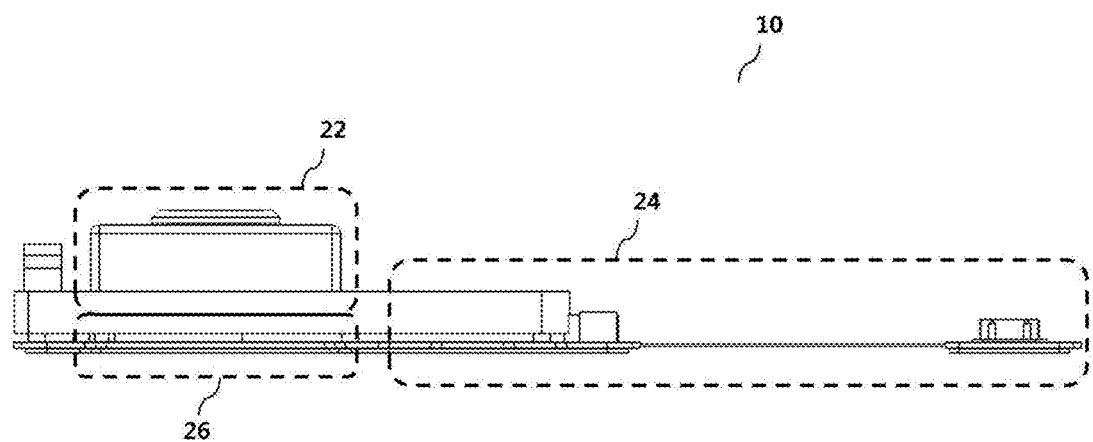
FIG. 1 is a view for explaining an example of a camera module according to an embodiment of the subject invention.

Hereinafter, exemplary embodiments will be described in detail with reference to the accompanying drawings. The embodiments may be modified in various ways and may have various forms, and specific embodiments will be illustrated in the drawings and will be described in detail herein. However, this is not intended to limit the embodiments to the specific embodiments, and the embodiment should be understood as including all modifications, equivalents, and replacements that fall within the sprit and technical scope of the embodiments.

Although the terms "first" and "second" and the like may be used to describe various elements, the embodiments should not be limited by the terms. These terms are used for distinguishing between similar elements. In addition, terms, which are specially defined in consideration of the configurations and operations of the embodiments, are given only to explain the embodiments, and do not limit the scope of the embodiments.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In addition, the relative terms "top/upper/above", "bottom/lower/under" and the like in the description and in the claims may be used to distinguish between any one substance or element and other substances or elements and not necessarily for describing any physical or logical relationship between the substances or elements or a particular order.

FIG. 1 is a view for explaining an example of a camera module according to an embodiment of the subject invention.

Referring to FIG. 1, the camera module 10 may include a lens assembly 22 including a liquid lens and a plurality of lenses, a control circuit 24, and an image sensor 26.

The liquid lens may include a conductive liquid, a non-conductive liquid, a first plate, and an electrode unit. The first plate may include a cavity in which the conductive liquid and the non-conductive liquid are accommodated. The electrode unit may be electrically connected to an external power supply so as to change the interface of the conductive liquid and the non-conductive liquid upon receiving a voltage. The liquid lens may further include an insulation layer disposed on the electrode unit so as to inhibit an electrode from coming into contact with the non-conductive liquid.

The camera module, to which the liquid lens is applied, may include a controller, which controls the voltage to be applied to the electrode unit. The electrode unit may include a first electrode and a second electrode, and the first electrode and the second electrode may include at least one electrode sector. The first electrode and the second electrode may electromagnetically interact with each other so as to change the interface of the conductive liquid and the non-conductive liquid.

The lens assembly 22 may include a plurality of lenses. The lens assembly 22 may be configured with a plurality of lenses including the liquid lens, and the focal length of the liquid lens may be adjusted so as to correspond to the drive voltage applied to the first electrode and the second electrode. The camera module 10 may further include the control circuit 24 for supplying a drive voltage to the liquid lens. The first electrode may be an individual electrode, and the second electrode may be a common electrode.

The camera module 10 may include a plurality of circuits 24 and 26 that are disposed on a single printed circuit board (PCB) and the lens assembly 22 including a plurality of lenses, but this is merely given by way of example, and the scope of the disclosure is not limited thereto. The configuration of the control circuit 24 may be designed in different ways according to the specifications required in the optical device. In particular, in order to reduce the magnitude of an operation voltage applied to the lens assembly 22, the control circuit 24 may be implemented in a single chip. Thereby, the size of an optical device, which is mounted in a portable device, may be further reduced.

The camera module 10 may be included in an optical device. The optical device may include a housing in which at least one of the camera module, a display unit, a communication module, a memory storage unit, or a battery is mounted.

Figure 2:
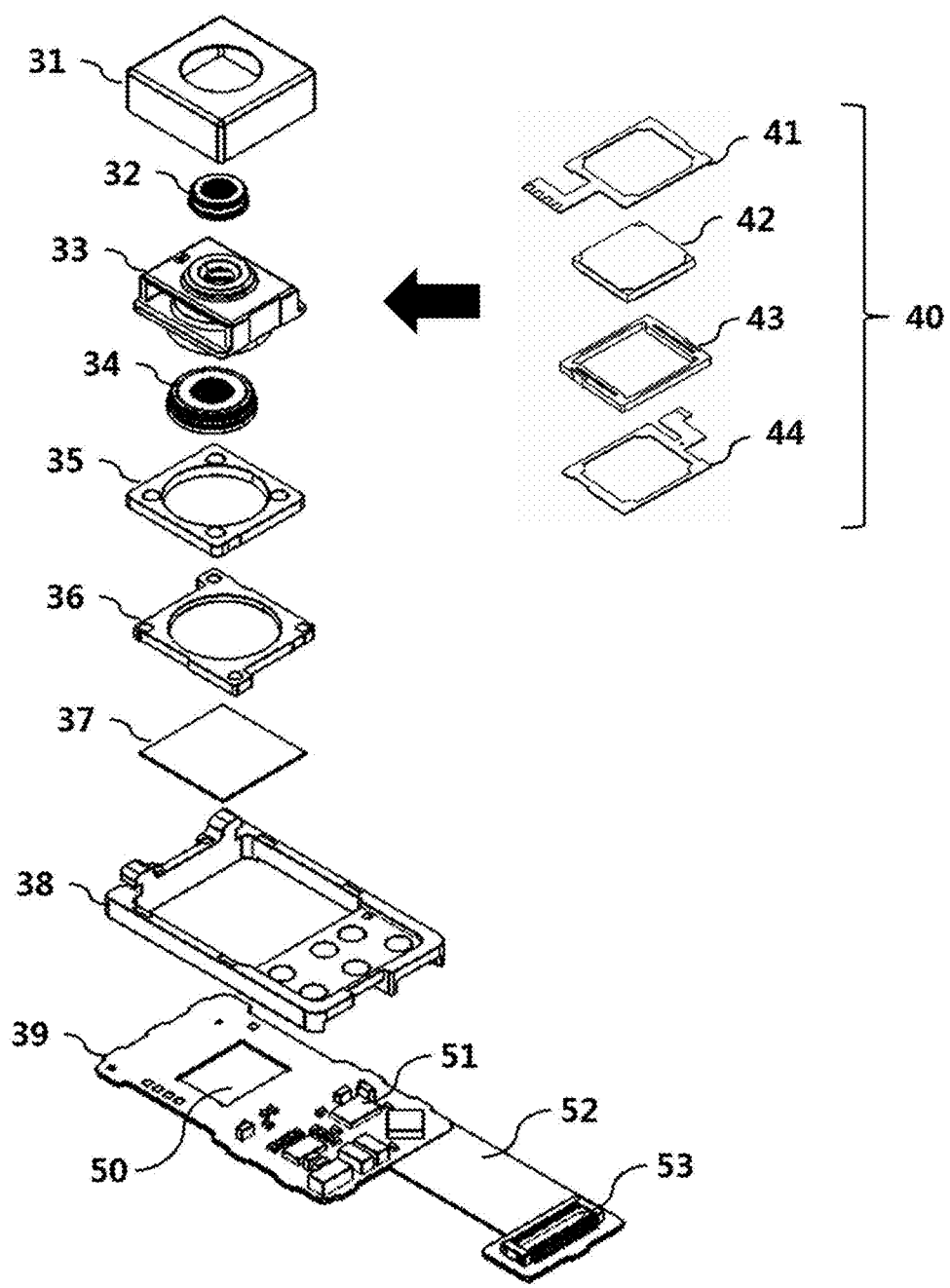
FIG. 2 is an exploded view illustrating the camera module of FIG. 1.

FIG. 2 is an exploded view illustrating the camera module 10.

Referring to FIG. 2, the camera module 10 may include a first cover 31, a first lens unit 32, a holder 33, a second lens unit 34, a middle base 35, a sensor base 36, a filter 37, a second cover 38, a main board 39, and a liquid lens unit 40. According to an embodiment, at least one component of the enumerated components 31 to 40 may be omitted, or at least one other component may further be included in the camera module 10.

The first cover 31 may cover a portion of the upper portion and a portion of the lateral portion of the holder 33 so as to protect the components disposed therein from external shocks or external foreign substances. The first cover 31 may surround the first lens unit 32, the holder 33, the second lens unit 34, the middle base 35, the sensor base 36, and the liquid lens unit 40, and may protect inner elements from external shocks.

The first lens unit 32 may be disposed in front of the lens assembly 22, and may be an area to which light is introduced from outside the lens assembly 22. The first lens unit 32 may be configured with at least one lens, or may form an optical system in which two or more lenses are aligned along a center axis. Here, the center axis may be the same as the optical axis of the optical system of the camera module 10. The first lens unit 32 may include two lenses, without being necessarily limited thereto.

An exposure lens (not illustrated) may be provided on the front surface of the first lens unit 32, and a glass cover may be disposed in front of the exposure lens. Since the exposure lens protrudes outward from the holder 33 and is exposed outwards, the surface thereof may be damaged. When the surface of the lens is damaged, the quality of an image captured by the camera module 10 may be deteriorated. Therefore, in order to inhibit or inhibit damage to the surface of the exposure lens, a glass cover may be disposed, or a coating layer may be formed. Alternatively, in order to inhibit damage to the surface of the exposure lens, for example, a method of forming the exposure lens using a wear-resistant material having higher rigidity than the lens that configures the first lens unit 32 or the second lens unit 34 may be used.

The holder 33 may include a first side surface having therein a first opening, and a second side surface having therein a second opening, which faces the first opening in the direction perpendicular to the optical-axis direction (e.g., perpendicular to the optical axis of a lens (e.g., a liquid lens) or lens unit (e.g., a liquid lens unit) of the camera module). The holder 33 may be open at the top and the bottom thereof so as to include a through-hole, and the first lens unit 32, the second lens unit 34, and the liquid lens unit 40 may be disposed in the through-hole formed in the holder 33. In addition, the first lens unit 32 and the second lens unit 34 may be defined as a first solid lens unit and a second solid lens unit to distinguish the same from the liquid lens unit 40. Specifically, the first lens unit 32 may be disposed in and coupled into a first hole, which is formed in the top of the holder 33, and the second lens unit 34 may be disposed in and coupled into a second hole, which is formed in the bottom of the holder 33. In addition, the liquid lens unit 40 may be disposed in and coupled into the first opening and/or the second opening, which are located between the first hole and the second hole. In addition, the liquid lens unit 40 may be located between the first hole and the second hole, and may be disposed in the space between the first opening and the second opening.

The second lens unit 34 may be disposed below the first lens unit 32 and the liquid lens unit 40, and light introduced into the first lens unit 32 from outside the camera module 10 may pass through the liquid lens unit 40 and be introduced into the second lens unit 34. The second lens unit 34 may be spaced apart from the first lens unit 32 and may be disposed in the second hole formed in the holder 33.

The middle base 35 may be disposed below the holder 33. The middle base 35 may be disposed and coupled so as to surround the second hole in the holder 33. The middle base 35 may include an accommodating hole for accommodating therein the second hole. The middle base 35 may include an opening into which a portion of the holder is inserted. Thus, the inner diameter of the middle base 35 (i.e. the diameter of the accommodating hole or the opening) may be equal to or greater than the outer diameter of the second hole. Here, each of the accommodating hole in the middle base 35 and the second through-hole is illustrated as having a circular shape, but the scope of the disclosure is not limited thereto, and these holes may be changed to various other shapes.

The sensor base 36 may be disposed below the middle base 35 and may be bonded to the main board 39. The sensor base 36 may surround an image sensor 50 and may protect the image sensor 50 from external foreign substances or shocks.

The filter 37 may filter light corresponding to a specific wavelength range from the light that has passed through the first lens unit 32, the liquid lens unit 40, and the second lens unit 34. The filter 37 may be an infrared (IR) cutoff filter or an ultraviolet (UV) cut filter, but the scope of the disclosure is not limited thereto. The filter 37 may be disposed above the image sensor. The filter 37 may be disposed inside the sensor base 36. The filter 37 may be disposed or mounted in an inner recess in the sensor base 36 or on a stepped portion thereof.

The second cover 38 may be mounted on the top of the main board 39, and may protect the components 31 to 37 as well as an element 51 on the main board 39 from external shocks or foreign substances. To this end, the second cover 38 may include a space for accommodating the element 51 therein, which is formed in consideration of the shape and position of the element 51, and a space for accommodating the lens assembly 22 therein, which is formed in consideration of the shape and position of the lens assembly 22 coupled to the components 31 to 37.

The main board 39 may be disposed below the sensor base 36, and may include a recess, in which the image sensor 50 is accommodated, the element 51, a flexible printed circuit board (FPCB) 52, and a connector 53.

The image sensor 50 may be mounted in a recess formed in the main board 39, and may perform a function of converting the light that has passed through the lens assembly 22 into image data. More specifically, the image sensor 50 may convert light into analog signals via a pixel array including a plurality of pixels, and may generate image data by synthesizing digital signals corresponding to the analog signals.

The main board 39 and the element 51 may constitute a module (e.g. a control circuit in FIG. 6), which controls the liquid lens unit 40 and the image sensor 50. The element 51 may include at least one of a passive element or an active element, and may have any of various widths and heights. That is, the element 51 may mean a plurality of circuit elements, and may have a height greater than the height of the main board 39 so as to protrude outward. The plurality of circuit elements may represent elements that do not overlap the holder in the direction parallel to the optical axis. In addition, the main board 39 may include a first area in which the holder is disposed and a second area in which the plurality of circuit elements is disposed.

The main board 39 may be configured as a rigid flexible printed circuit board (RFPCB) including the FPCB 52. The FPCB 52 may bend depending on the requirement of the space in which the camera module 10 is mounted.

The connector 53 may electrically connect the main board 39 to a power supply or any other device (e.g. an application processor) outside the camera module 10.

The liquid lens unit 40 may be inserted into an insertion hole formed between the first through-hole and the second through-hole in the holder 33. The liquid lens unit 40 may be inserted into or disposed in the first opening and/or the second opening, which are formed in the sidewalls of the holder. The liquid lens unit 40 may include a liquid lens 42. The liquid lens unit 40 may have a structure in which connection substrates 41 and 44 or a spacer 43 are connected to the liquid lens 42. In addition, the liquid lens unit 40 may have a structure in which the connection substrates 41 and 44 and the spacer 43 are connected to the liquid lens 42. In an embodiment, the liquid lens unit 40 may include an individual electrode connection substrate 41, the liquid lens 42, the spacer 43, and a common electrode connection substrate 44, but at least one of the spacer 43 or the connection substrates 43 and 44 may be omitted.

The individual electrode connection substrate 41 may electrically connect an individual electrode of the liquid lens unit 40 to the main board 39. The individual electrode connection substrate 41 may be implemented into an FPCB. The individual electrode connection substrate 41 may be defined as a second connection substrate. The liquid lens 42 may include a plurality of plates formed so as to accommodate two different types of liquids.

The spacer 43 may be coupled so as to surround the liquid lens 42, and may protect the liquid lens 42 from external shocks. The spacer 43 may be disposed in a ring shape so as to surround the side surface of the liquid lens 42. The spacer 43 may be disposed between the first connection substrate and the second connection substrate. The spacer 43 may be disposed in the opening in the holder 33. In addition, the spacer 43 may be disposed so as to protrude outward through the opening in the holder 33. The upper surface or the lower surface of the spacer 43 may be provided with an uneven portion. When an adhesive is applied to the uneven portion, the spacer may achieve increased adhesive coupling force with the connection substrates. In addition, the spacer 43 may be brought into contact with a gripper when inserted into the holder 33 or during active alignment.

The common electrode connection substrate 44 may electrically connect the common electrode of the liquid lens unit 40 to the main board 39. The common electrode connection substrate 44 may be implemented as a flexible printed circuit board (FPCB) or a single metal substrate (conductive metal plate), and may be implemented as a metal plate including an insulation layer provided in at least a portion thereof excluding an exposed pad at a position corresponding to the common electrode of the liquid lens 42 and an exposed pad at a position corresponding to a common electrode pad of the main board 39. This structure will be described later with reference to FIGS. 12 and 13. The common electrode connection substrate 44 may be defined as the first connection substrate.

Each of the connection substrates 41 and 44 may have a shape corresponding to the shape of the spacer 43, and may include an area that overlaps the spacer 43, and an area that overlaps the electrode of the liquid lens 42, in the direction parallel to the optical axis. The area that overlaps the electrode may be formed so as to protrude or extend inward from the inner circumference of the area that overlaps the spacer 43.

Figure 3:
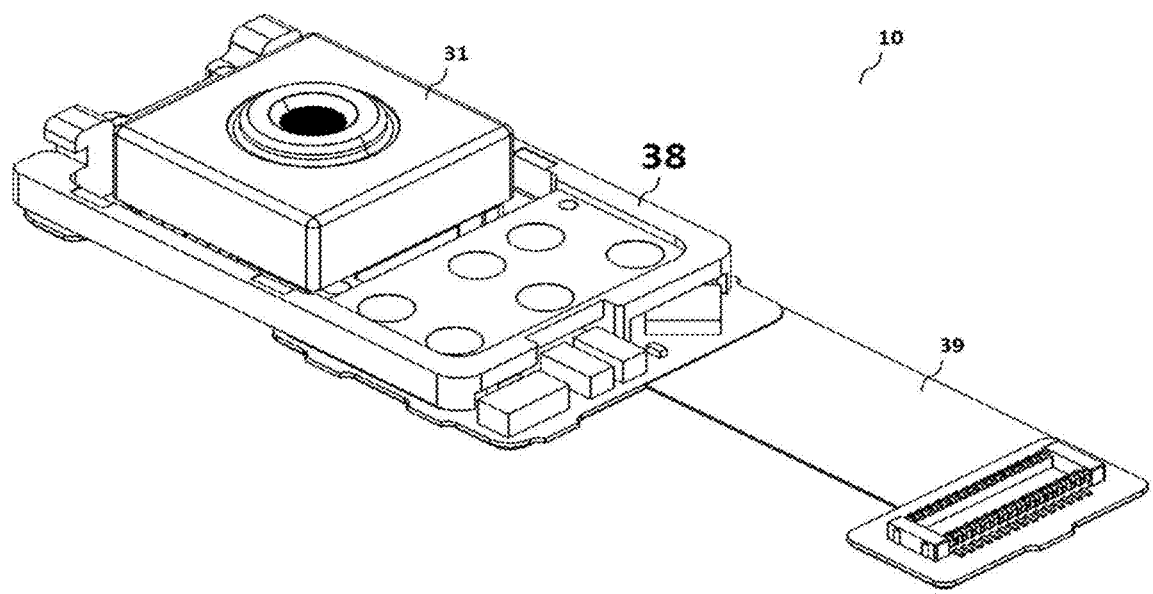
FIG. 3 is a perspective view illustrating the camera module illustrated in FIG. 1.

FIG. 3 is a perspective view illustrating the camera module illustrated in FIG. 1.

Referring to FIG. 3, the first cover 31 included in the camera module 10 may be disposed so as to effectively protect a plurality of lenses constituting an optical system from external shocks.

The second cover 38 may protect the element 51 on the top of the main board 39, and may accommodate and protect the first cover 31 therein.

Figure 4:
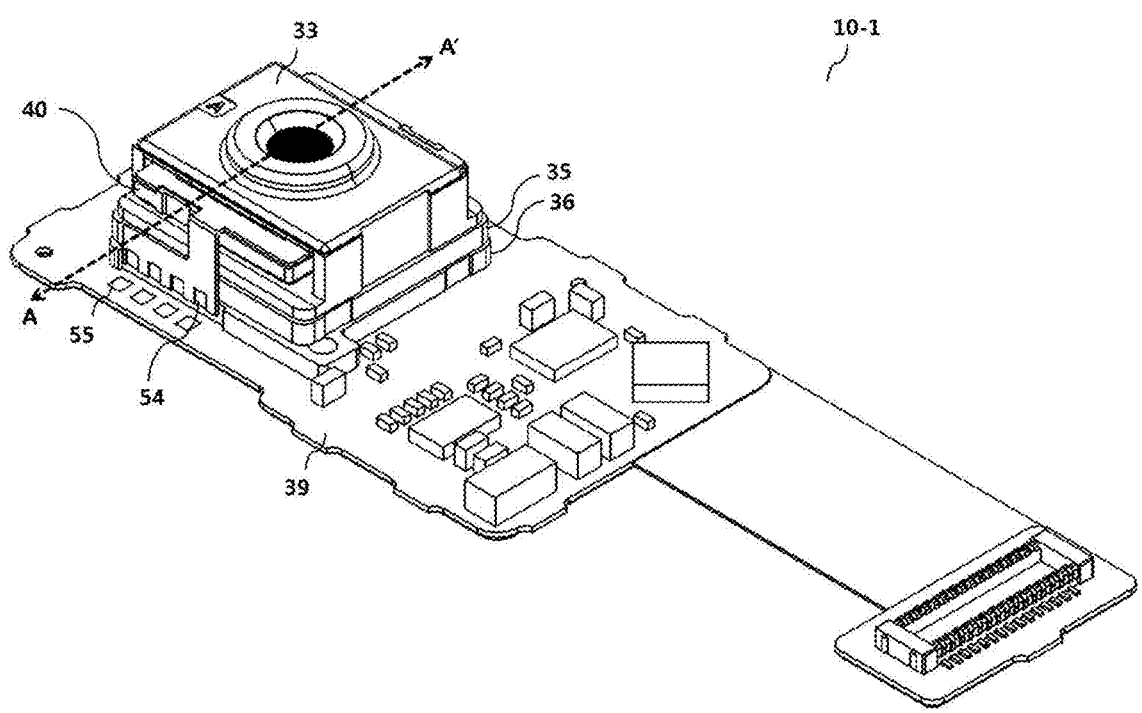
FIG. 4 is a perspective view illustrating the state in which some components are removed from the camera module illustrated in FIG. 3.

FIG. 4 is a perspective view illustrating the state in which some components are removed from the camera module illustrated in FIG. 3.

Referring to FIG. 4, a camera module 10-1 in the state in which the first cover 31 and the second cover 38 are removed from the camera module 10 is illustrated.

The sensor base 36 may be mounted on the main board 39 so as to be spaced apart from the element 51. The holder 33 in which the middle base 35, the second lens unit 34, the liquid lens unit 40, and the first lens unit 32 are disposed may be disposed above the sensor base 36.

Each of the common electrode connection substrate 44 and the individual electrode connection substrate 41 may bend toward the main board 39. The individual electrode connection substrate 41 may be electrically connected to an electrode pad 55, which is formed on the main board 39, via a connection pad 54, which is electrically connected to respective individual electrodes. The connection pad 54 and the electrode pad 55 may be electrically connected to each other using conductive epoxy or by soldering, but the scope of the disclosure is not limited thereto.

In the same manner, the common electrode connection substrate 44 may be electrically connected to an electrode pad, which is formed on the main board 39, via a connection pad, which is electrically connected to the common electrode.

Here, the electrode pads, which are connected to the common electrode connection substrate 44 and the individual electrode connection substrate 41, may be respectively defined as a first pad portion and a second pad portion, and each of the first pad portion and the second pad portion may be disposed in a direction from the center of the liquid lens (the first side surface or the second side surface, which will be described in FIG. 10) to be opposite the element 51 disposed on the main board 39.

Figure 5:
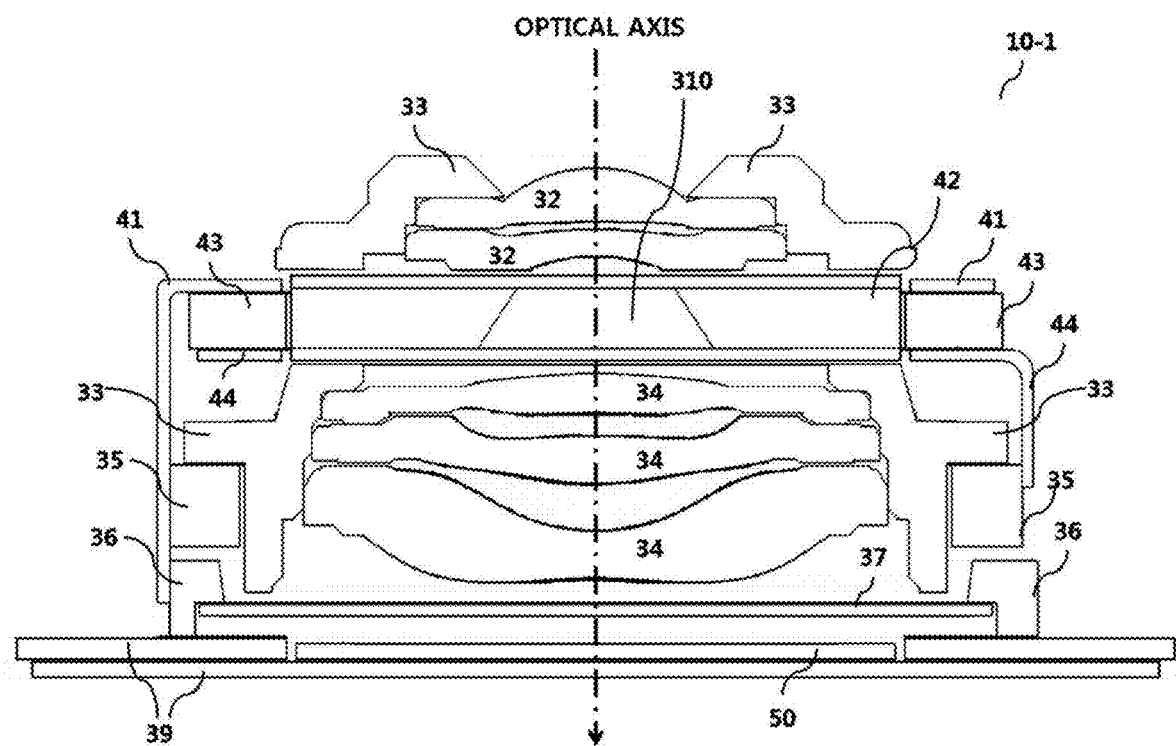
FIG. 5 is a cross-sectional view illustrating the camera module illustrated in FIG. 4.

FIG. 5 is a cross-sectional view illustrating the camera module illustrated in FIG. 4.

Referring to FIG. 5, the illustrated cross-sectional structure (the cross section taken along line A-A' of FIG. 4) of the camera module 10-1 is merely given by way of example, and the structure of the camera module 10-1 may be changed according to the specifications required of an optical device. For example, the liquid lens unit 40 is located between the first lens unit 32 and the second lens unit 34 in the illustrated example, but the first lens unit 32 or the second lens unit may be omitted in another example. In addition, the liquid lens unit 40 may be located above (on the front surface of) the first lens unit 32, or the liquid lens unit 40 may be located below the second lens unit 34.

The liquid lens unit 40 includes a cavity 310 defined by an open area. In another example, the liquid lens unit 40 may be disposed such that the direction of inclination of the cavity 310 is opposite that of the liquid lens unit. This may mean that, unlike FIG. 5, the open area in the direction in which light is introduced into the cavity 310 is smaller than the open area in the opposite direction. That is, the open area of the cavity 310 may be determined such that the open area in the light introduction direction is smaller or greater than the open area in the opposite direction. When the liquid lens unit 40 is disposed so that the direction of inclination of the cavity 310 is opposite to that of the liquid lens unit, depending on the direction of inclination of the liquid lens unit 40, a part or the entirety of the arrangement of components of the liquid lens unit such as the electrode and the liquids may be changed, or only the direction of inclination of the cavity may be changed and the remainder of the arrangement may not be changed. That is, the vertical positions of the respective components of the liquid lens unit 40 may be changed.

The liquid lens unit 40 may include the cavity 310. The cavity 310 is a region through which the light that has passed through the first lens unit 32 passes, and may include a liquid in at least a portion thereof. For example, two types of liquids, i.e. a conductive liquid and a non-conductive liquid (or insulative liquid) may be included together in the cavity 310, and the conductive liquid and the non-conductive liquid may not be mixed with each other, but an interface may be formed between the conductive liquid and the non-conductive liquid. The interface between the conductive liquid and the non-conductive liquid may be deformed by a drive voltage applied via the common electrode connection substrate 44 and the individual electrode connection substrate 41, such that the curvature and/or the focal length of the liquid lens unit 40 may be changed. When the deformation and the change in curvature of the interface are controlled, the liquid lens unit 40, the lens assembly 22, the camera module 10, and the optical device including the same may perform an auto-focusing (AF) function, a handshaking correction function, an optical image stabilization (OIS) function, or the like.

As described above, the holder 33 may include the first through-hole (or the first hole), in which the first lens unit 32 is disposed, the insertion hole, in which the liquid lens unit 40 is disposed, and the second through-hole (or the second hole) in which the second lens unit 34 is disposed. The first hole and the second hole may overlap each other in the optical-axis direction.

The first lens unit 32 may include two lenses and the second lens unit 34 may include three lenses, but this is merely given by way of example, and the number of lenses included in the respective lens units 32 and 34 may be changed. Meanwhile, a lens located on the top of the first lens unit 32 may protrude upward so as to perform a function of the exposure lens. In addition, the outer diameters of the lenses included in the lens units 32 and 34 may increase downward, but the scope of the disclosure is not limited thereto.

The optical axis may be the optical axis of the image sensor 50, and may also be the optical axis of the optical system formed by the first lens unit 32, the liquid lens unit 40, and the second lens unit 34. That is, the image sensor 50, the first lens unit 32, the liquid lens unit 40, and the second lens unit 34 may be disposed so as to be aligned along a single optical axis via active alignment.

Here, active alignment may mean an operation of aligning the optical axis of each of the first lens unit 32, the second lens unit 34, and the liquid lens unit 40 with the optical axis of the image sensor 50. In an embodiment, active alignment may be performed by an operation in which the image sensor 50 generates and analyzes image data when receiving light introduced from a specific object via at least one of the first lens unit 32, the second lens unit 34, or the liquid lens unit 40.

Although active alignment may be performed in various sequences, in this specification, it is assumed that first alignment between the first and second lens units 32 and 34 fixed and mounted to the holder 33 and the image sensor 50 is completed, and thereafter second alignment between the liquid lens unit 40 inserted into the holder and the image sensor 50 is performed. First alignment may be performed as a gripper grips the middle base 35 mounted to the holder 33 and displaces the middle base to various positions, and second alignment may be performed as the gripper grips the spacer 43 of the liquid lens unit 40 and displacers the spacer to various positions. This is merely given as an embodiment, and active alignment may be performed in any other order.

Each of the respective components 31 to 40 described in FIGS. 1 to 5 may be fixed and bonded to each other using epoxy. To this end, when attempting to fix and bond two components among the components 31 to 40, epoxy application, UV curing, and thermal curing may be sequentially performed. In some embodiments, any one curing process may be omitted according to the material or characteristics of the components, and another bonding process may be added.

Figure 6:
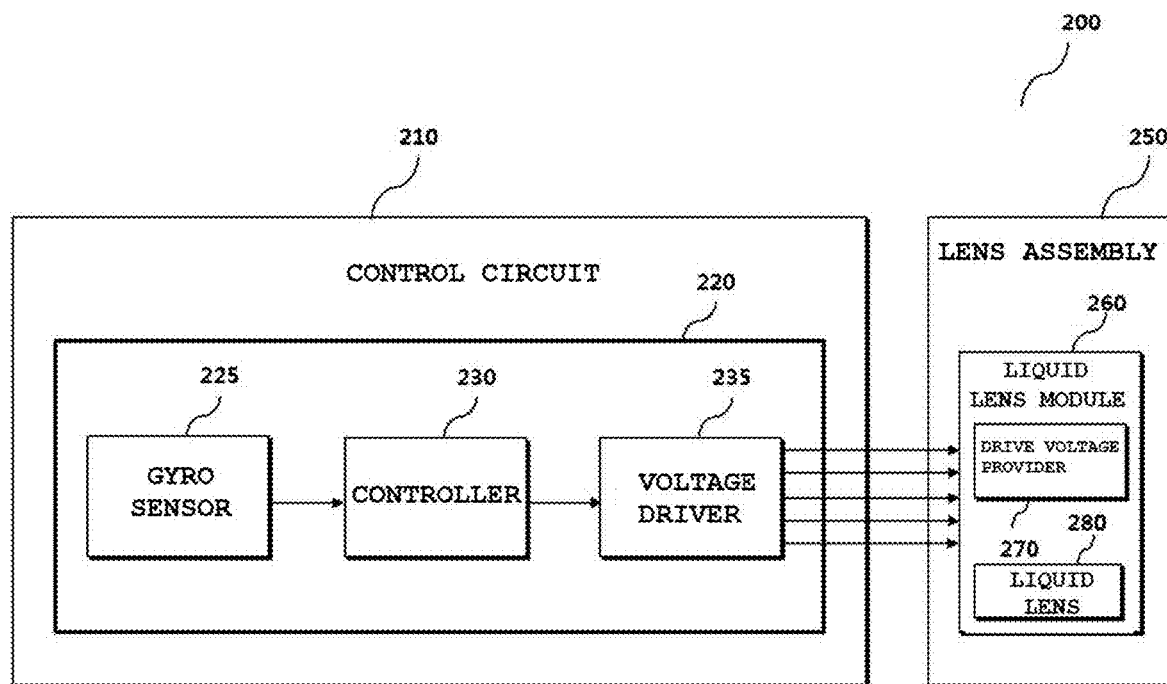
FIG. 6 is a block diagram illustrating a camera module in brief.

FIG. 6 is a block diagram illustrating a camera module in brief.

Referring to FIG. 6, a control circuit 210 and a lens assembly 250 included in the camera module 200 are illustrated, and the control circuit 210 and the lens assembly 250 may correspond to the control circuit 24 and the lens assembly 22 of FIG. 1, respectively.

The control circuit 210 may include a control unit 220.

The control unit 220 is a component for performing an AF function and an OIS function, and may control a liquid lens module 260 included in the lens assembly 250 using a user request or a sensed result (e.g. a movement signal of a gyro sensor 225).

The control unit 220 may include a controller 230 and a voltage driver 235. The gyro sensor 225 may be an independent component, which is not included in the control unit 220, or the control unit 220 may further include the gyro sensor 225.

The gyro sensor 225 may sense the angular speed of a movement in two directions, including a yaw axis and a pitch axis, in order to compensate for (or, correct) handshaking in the horizontal and vertical directions of an optical device. The gyro sensor 225 may generate a movement signal corresponding to the sensed angular speed and provide the signal to the controller 230.

The controller 230 may remove a high frequency noise component from the movement signal using a low-pass filter (LPF) so as to extract only a desired frequency band for the implementation of an OIS function, may calculate the amount of handshaking using the movement signal from which the noise component has been removed, and may calculate a drive voltage corresponding to the shape that a liquid lens 280 of the liquid lens module 260 needs to have in order to compensate for the calculated amount of handshaking.

The controller 230 may receive information for an AF function (i.e. information on the distance to an object) from an internal component (e.g. an image sensor) or an external component (e.g. a distance sensor or an application processor) of the camera module 200 or the optical device, and may calculate the drive voltage corresponding to the desired shape of the liquid lens 280 based on a focal length, which is required to focus on the object, using the distance information.

The controller 230 may store a drive voltage table in which a drive voltage and a drive voltage code for making the voltage driver 235 generate the drive voltage are mapped, and may acquire the drive voltage code corresponding to the calculated drive voltage by referring to the drive voltage table.

The voltage driver 235 may generate a drive voltage in an analog form, which corresponds to the drive voltage code, based on a drive voltage code in a digital form provided from the controller 230, and may provide the drive voltage to the lens assembly 250.

The voltage driver 235 may include a voltage booster, which increases a voltage level upon receiving a supply voltage (e.g. a voltage supplied from a separate power supply circuit), a voltage stabilizer for stabilizing the output of the voltage booster, and a switching unit for selectively supplying the output of the voltage booster to each terminal of the liquid lens 280.

Here, the switching unit may include a circuit component called an H bridge. A high voltage output from the voltage booster is applied as a power supply voltage of the switching unit. The switching unit may selectively supply the applied power supply voltage and a ground voltage to opposite ends of the liquid lens 280. Here, the liquid lens 280 may include a first electrode including four electrode sectors and a second electrode including one electrode sensor for driving. Opposite ends of the liquid lens 280 may mean the first electrode and the second electrode. In addition, opposite ends of the liquid lens 280 may mean any one of the four electrode sectors of the first electrode and one electrode sector of the second electrode.

A pulse-type voltage having a predetermined width may be applied to each electrode sector of the liquid lens 280, and the drive voltage applied to the liquid lens 280 is the difference between the voltages applied respectively to the first electrode and the second electrode. Here, the voltage applied to respective electrode sectors of the first electrode may be defined as an individual voltage, and the voltage applied to the electrode sector of the second electrode may be defined as a common voltage.

That is, in order to allow the voltage driver 235 to control a drive voltage applied to the liquid lens 280 depending on a drive voltage code in a digital form provided from the controller 230, the voltage booster may control an increase in a voltage level, and the switching unit may control the phase of a pulse voltage applied to a common electrode and an individual electrode so as to generate a drive voltage in an analog form, which corresponds to the drive voltage code.

That is, the control unit 220 may control the voltage applied to each of the first electrode and the second electrode.

The control circuit 210 may further include a connector (not illustrated), which performs a communication or interface function of the control circuit 210. For example, the connector may perform communication protocol conversion for communication between the control circuit 210, which uses an inter-integrated circuit ($I^2C$) communication method, and the lens assembly 250, which uses a mobile industry processor interface (MIPI) communication method.

In addition, the connector may receive power from an external source (e.g. a battery), and may supply power required for the operation of the control unit 220 and the lens assembly 250. In this case, the connector may be the same as the connector 53 of FIG. 2.

The lens assembly 250 may include the liquid lens module 260, and the liquid lens module 260 may include a drive voltage provider 270 and the liquid lens 280.

The drive voltage provider 270 may receive a drive voltage (i.e. an analog voltage applied between one common electrode and any one individual electrode among "n" individual electrodes, ("n" being an integer of 2 or more)) from the voltage driver 235, and may provide the drive voltage to the liquid lens 280. The drive voltage provider 270 may include a voltage adjustment circuit or a noise removal circuit for compensating for loss due to terminal connection between the control circuit 210 and the lens assembly 250, or may bypass the output voltage.

The drive voltage provider 270 may be disposed on a flexible printed circuit board (FPCB) or a first substrate, which constitutes at least a portion of a connector 53 of FIG. 2, but the scope of the disclosure is not limited thereto. The connector 53 may include the drive voltage provider 270.

The liquid lens 280 may perform an AF function or an OIS function through the deforming of the interface between a conductive liquid and a non-conductive liquid depending on a drive voltage.

Figure 7:
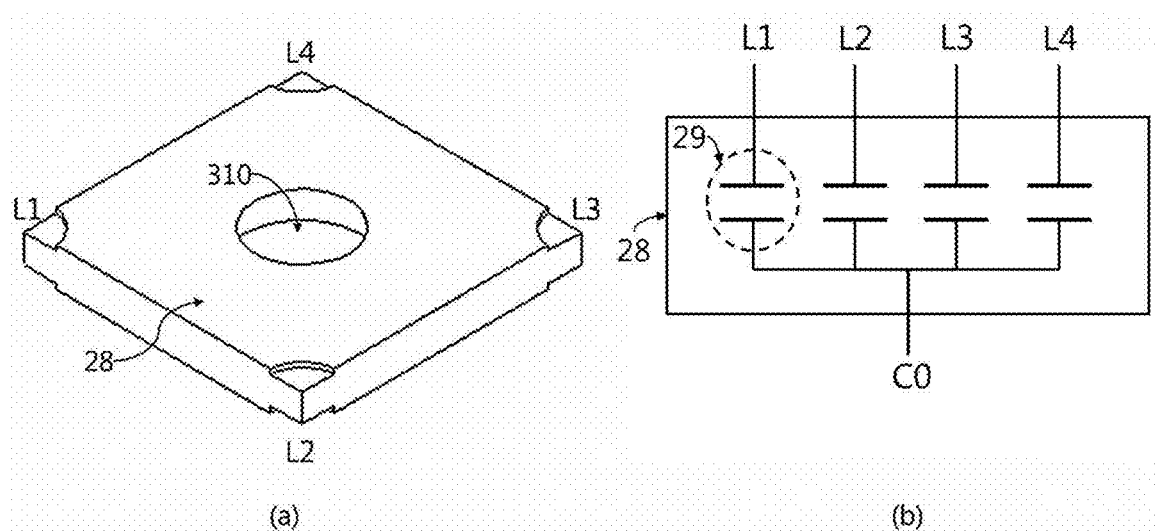
FIG. 7 is a view for explaining a liquid lens, the interface of which is adjusted to correspond to a drive voltage.

FIG. 7 is a view for explaining a liquid lens, the interface of which is adjusted to correspond to a drive voltage. Specifically, (a) explains a liquid lens 28 included in the lens assembly 22, and (b) explains an equivalent circuit of the liquid lens 28. Here, the liquid lens 28 is the same as the liquid lens 42 of FIG. 2.

Referring first to (a), the liquid lens 28, the interface of which is adjusted to correspond to a drive voltage, may receive the drive voltage via a plurality of electrode sectors L1, L2, L3 and L4, which are disposed in four different directions to have the same angular distance therebetween and constitute a first electrode, and an electrode sector CO of a second electrode. When the drive voltage is applied via the plurality of electrode sectors L1, L2, L3 and L4, which constitute the first electrode, and the electrode sector CO, which constitutes the second electrode, the interface between the conductive liquid and the non-conductive liquid, which are accommodated in the cavity 310, may be deformed. The degree of deformation and the shape of the interface between the conductive liquid and the non-conductive liquid may be controlled by the controller 230 in order to implement an AF function or an OIS function.

In addition, referring to (b), the lens 28 may be explained as a plurality of capacitors 29 in which one side of the lens 28 receives a voltage from the different electrode sectors L1, L2, L3 and L4 of the first electrode, and the other side is connected to the electrode sector CO of the second electrode so as to receive a voltage therefrom.

The number of different electrode sectors has been described as being four in this specification by way of example, but the scope of the disclosure is not limited thereto.

Figure 8:
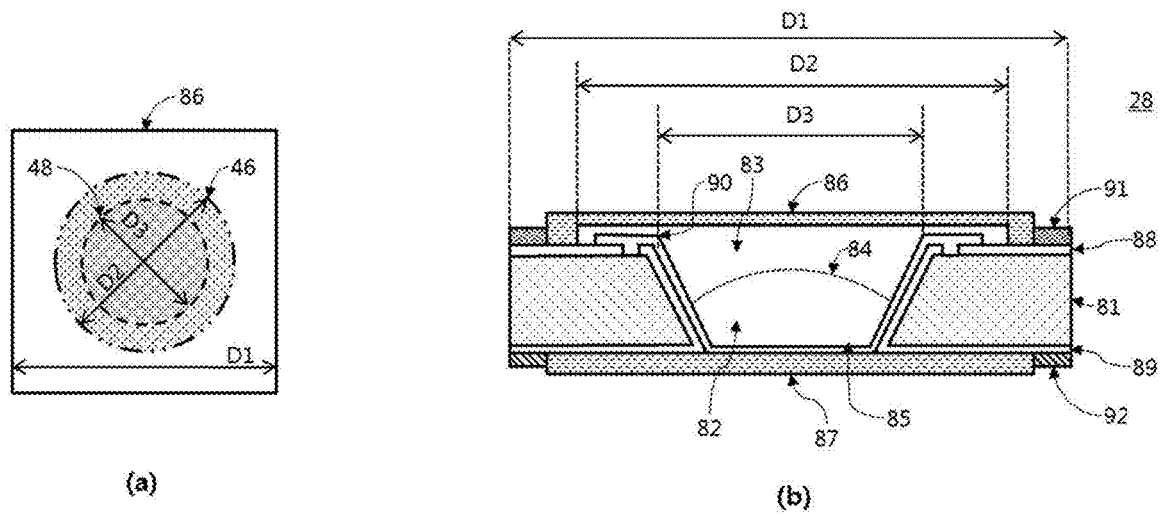
FIG. 8 is a view for explaining a liquid lens of an embodiment of the subject invention.

FIG. 8 is a view for explaining an embodiment of the liquid lens. Specifically, (a) in FIG. 8 is a top view illustrating the embodiment of the liquid lens, and (b) in FIG. 8 is a cross-sectional view illustrating the embodiment of the liquid lens.

Referring to FIG. 8, the liquid lens 28 may include two different types of liquids, a first plate 81, and electrodes. The two liquids 82 and 83 included in the liquid lens may include a conductive liquid and a non-conductive liquid. The first plate 81 may include a cavity 85 in which the conductive liquid and the non-conductive liquid are accommodated. The sidewall surface of the cavity 85 may include an inclined surface. The electrodes may be disposed on the first plate 81, and may be disposed on the top of the first plate 81 or the bottom of the first plate 81. The liquid lens 28 may further include a second plate 86, which may be disposed above (below) the electrodes. In addition, the liquid lens may further include a third plate 87, which may be disposed below (above) the electrodes. As illustrated, in one embodiment, the liquid lens 28 may include an interface 84 defined by the two different types of liquids 82 and 83. In addition, one or more substrates 91 and 92 may be included to supply a voltage to the liquid lens 28. Here, the substrates 91 and 92 may respectively mean the common electrode connection substrate 44 and the individual electrode connection substrate 41. The corners of the liquid lens 28 may be thinner than the center portion of the liquid lens 28. The corners of the second plate or the third plate may be partially removed so that portions of the electrodes disposed on the first plate are exposed.

The liquid lens 28 may include two different types of liquids, for example, the conductive liquid 83 and the non-conductive liquid 82, and the curvature and shape of the interface 84 defined by the two different types of liquids may be adjusted by a drive voltage supplied to the liquid lens 28. The drive voltage supplied to the liquid lens 28 may be transferred via the first substrate 92 and the second substrate 91. The first substrate 92 may transfer four individual drive voltages, which are distinguished from each other, and the second substrate 91 may transfer a single common voltage. The common voltage may include a DC voltage or an AC voltage. When the common voltage is applied in a pulse form, the pulse width or the duty cycle may be consistent. The voltage supplied via the second substrate 91 and the first substrate 92 may be applied to a plurality of electrodes 88 and 89, which are exposed on the respective corners of the liquid lens 28. Conductive epoxy may be disposed between the electrodes and the substrates, and the electrodes and the substrates may be coupled to each other in an electrical conduction manner via the conductive epoxy.

In addition, the liquid lens 28 may include the first plate 81, which is located between the third plate 87 and the second plate 86, both of which include a transparent material. The first plate includes an open area defined by a surface having a predetermined inclination.

The second plate 86 may have a square shape having a first width D1. The second plate 86 may be bonded to the first plate 81 by being in contact at the bonding area around the edge with the first plate, and the first plate 81 may have an inclined surface and a diameter D3 of a wide open area 48 may be smaller than the diameter D2 of a peripheral area 46. The peripheral area 46 may overlap the upper surface of the first plate 81 and the liquids in the vertical direction or in the direction parallel to the optical axis. A portion of the first electrode 88 disposed on the first plate 81 may be exposed so that a portion of the electrode pattern formed on the first plate 81 may be exposed to the conductive liquid. In some embodiments, the second plate 86 may have a diameter D2 greater than the diameter D3 of the wide open area in the first plate 81.

In addition, the liquid lens 28 may include the cavity 85 defined by the third plate 87, the second plate 86, and the open area in the first plate 81. Here, the cavity 85 may be filled with the two different types of liquids 82 and 83 (e.g. the conductive liquid and the non-conductive liquid), and the interface 84 may be formed between the two different types of liquids 82 and 83.

In addition, at least one of the two liquids 82 and 83 included in the liquid lens 28 may be conductive, and the liquid lens 28 may further include an insulation layer 90 disposed on the inclined surface at which the two electrodes 88 and 89 disposed above and below the first plate 81 may be in contact with the conductive liquid. The insulation layer 90 may be disposed between the inner inclined surface of the first plate 81 and the liquids 82 and 83. Here, the insulation layer 90 may cover one electrode (e.g. the second electrode 89) among the two electrodes 88 and 89, and may expose a portion of the other electrode (e.g. the first electrode 88) so that electricity is applied to the conductive liquid (e.g. 83). Here, the first electrode 88 may include at least one electrode sector, and the second electrode 89 may include two or more electrode sectors. For example, the second electrode 89 may include a plurality of electrode sectors sequentially disposed in the clockwise direction about the optical axis.

One or two or more substrates 91 and 92 may be connected to transfer a drive voltage to the two electrodes 88 and 89 included in the liquid lens 28. The focal length of the liquid lens 28 may be adjusted as the flexion, inclination, or the like of the interface 84 formed in the liquid lens 28 is changed to correspond to the drive voltage.

Meanwhile, the first plate 81 may include the open area, and the open area may include a wide open area and a narrow open area defined by the inner inclined surface of the first plate 81. The diameter D3 of the wide open area may be changed depending on the field of view (FOV) required for the liquid lens or the role of the liquid lens in a camera device. The open area may take the form of a hole having a circular cross section, and the inclined surface of the open area may have an inclination angle ranging from 55 degrees to 65 degrees. The interface 84 formed by the two liquids may be moved along the inclined surface of the open area by the drive voltage.

Figure 9:
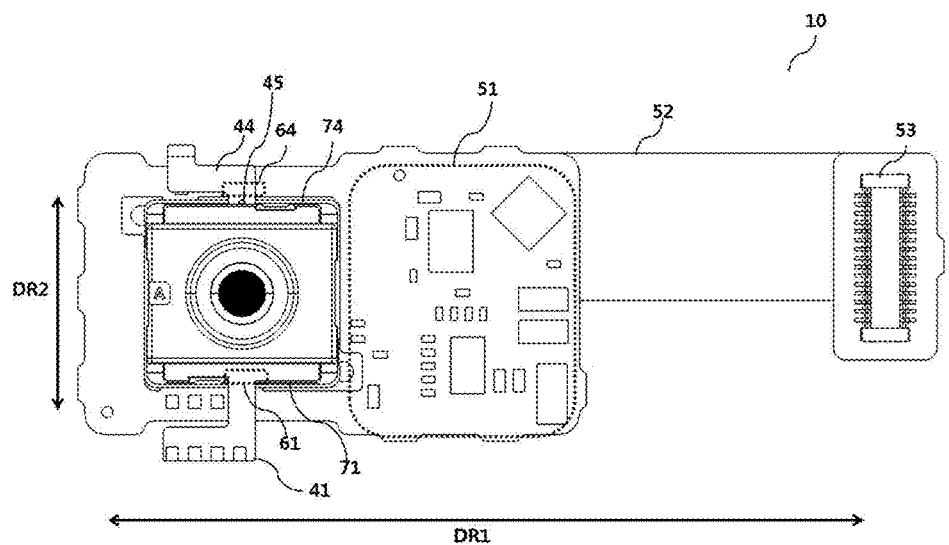
FIG. 9 is a top view illustrating the camera module illustrated in FIG. 4.

FIG. 9 is a top view illustrating the camera module illustrated in FIG. 4.

Referring to FIG. 9, the camera module 10-1 may be divided into an area in which the lens assembly 22 is disposed, an area in which the element 51 is disposed, the FPCB 52, and the connector 53. In addition, unlike FIG. 4, FIG. 9 illustrates the state in which the common electrode connection substrate 44 and the individual electrode connection substrate 41 are not subjected to bending.

In FIG. 9, the direction parallel to the long side (or the first side) of the main board 39 having a rectangular shape is defined as a first direction DR1, and the direction parallel to the short side (or the second side) of the main board 39 is defined as a second direction DR2. The respective sides of the main board 39 may be uneven.

In addition, the long side may conceptually include a first long side located at the upper side and a second long side located at the lower side, and the short side may be disposed between the first long side and the second long side or may interconnect the first long side and the second long side.

According to an embodiment of a method of manufacturing the camera module 10-1, the image sensor 50 may be mounted on the main board 39, and the sensor base 36 coupled to the filter 37 may be coupled to the main board 39.

Thereafter, active alignment (first alignment) may be performed to adjust relative positions between the first lens unit 32 and the second lens unit 34, which are disposed in the holder 33 coupled to the middle base 35, and the image sensor 50 disposed on the main board 39. First alignment may be performed by adjusting the positions of the middle base 35 and the holder coupled to the middle base 35 while supporting opposite sides of the middle base 35. First alignment may be performed while moving a jig, which presses and fixes opposite sides of the middle base 35. The middle base 35 and the sensor base 36 may be coupled to each other in the state in which first alignment is completed.

Thereafter, the liquid lens unit 40 may be inserted into the insertion hole in the holder 33, and active alignment (second alignment) between the liquid lens unit 40 and the image sensor 50 may be performed. Second alignment may be performed by adjusting the position of the liquid lens unit 40 while supporting the liquid lens unit 40 in the second direction DR2. Second alignment may be performed by adjusting the position of the liquid lens unit 40 while supporting the spacer 43 of the liquid lens unit 40 in the second direction DR2. Second alignment may be performed while moving a jig, which presses and fixes the liquid lens unit 40 in the second direction DR2.

At this time, in the case where the open area of the insertion hole in the holder 33 is disposed along the short side of the main board 39 and second alignment needs to be performed while moving a jig, which presses and fixes the liquid lens unit 40, in the first direction DR1, there is a risk of the element 51 included in the main board 39 being damaged due to movement of the jig. In addition, when the movement of the jig is limited in order to inhibit damage to the element 51, second alignment may not be appropriately completed and the performance of the camera module 10-1 may be greatly deteriorated. In addition, a soldering process is required in order to electrically connect the respective connection substrates 41 and 44 to the main board 39 after a bending process. In this case, a pad of the main board 39 connected to any one of the connection substrates 41 and 44 becomes close to the element 51, which may cause damage to the element 51, and the difficulty of the soldering process may be increased.

However, with the camera module 10-1 according to the embodiment, since the open area of the insertion hole in the holder 33, which is coupled to the main board 39, is disposed along the long side of the main board 39 (alternatively, a virtual straight line, which passes through the open area in the insertion hole in the direction parallel to the short side, does not overlap the element 51), second alignment may be performed while moving a jig, which presses and fixes the liquid lens unit 40, in the second direction DR2. That is, since the movement range of the jig may not overlap the area in which the element 51 is located, there is no risk of damage to the element 51 and second alignment may be appropriately completed. In addition, the difficulty of the process of soldering the respective connection substrates 41 and 44 to the main board 39 may be reduced and the occurrence of damage to the element 51 may be inhibited.

In the state in which second alignment is completed, the holder 33 and the liquid lens unit 40 may be bonded and fixed to each other via a bonding process (e.g. an epoxy application and curing process). After the bonding process is completed, each of a first bending area 64 (or a first bending portion) of the common electrode connection substrate 44 and a second bending area 61 (or the second bending portion) of the individual electrode connection substrate 41 may be subjected to a bending process. The bending process means a process of folding the respective substrates 41 and 44 toward the main board 39 along a predetermined bending line. The connection substrates may include a groove 45 in the bending portion thereof for easy bending. The bending line may be included in each of the first bending area 64 or the second bending area 61. The length of each of the first bending area 64 and the second bending area 61 may be experimentally predetermined for easy bending.

As illustrated in FIG. 9, the first bending area 64 may be disposed close to the center of an exposed side 74 of the common electrode connection substrate 44 and the second bending area 61 may be disposed close to the center of an exposed side 71 of the individual electrode connection substrate 41. For example, the center of the exposed side 74 and the center of the exposed side 71 may be included respectively in the first bending area 64 and the second bending area 61. According to another embodiment, any one of the center of the exposed side 74 and the center of the exposed side 71 may be included in a corresponding one of the first bending area 64 and the second bending area 61.

Alternatively, even if any one of the center of the exposed side 74 and the center of the exposed side 71 is not included in a corresponding one of the first bending area 64 and the second bending area 61, the first bending area 64 may be disposed as close as possible to the center of the exposed side 74 of the common electrode connection substrate 44, and the second bending area 61 may be disposed as close as possible to the center of the exposed side 71 of the individual electrode connection substrate 41.

Upon the implementation of the bending process, a floating or deformation phenomenon may occur due to the stress of epoxy, which fixes the holder 33 and the liquid lens unit 40 to each other. This phenomenon may cause a change in the position of the liquid lens unit 40 determined by second alignment, thereby greatly deteriorating the performance of the camera module 10-1. As the first bending area 64 and the second bending area 61 are located respectively closer to the edges of the exposed side 74 of the common electrode connection substrate 44 and the exposed side 71 of the individual electrode connection substrate 41, the floating or deformation phenomenon due to the stress of epoxy may be worsened.

Thus, with the camera module 10-1 according to the embodiment, the performance of the camera module 10-1 may be increased by minimizing a floating or deformation phenomenon due to the stress of an adhesive between the liquid lens unit 40 and the holder 33.

In addition, as illustrated in FIG. 9, pads, which are provided on the main board 39 for electrical connection with the respective connection substrates 41 and 44, may be disposed farthest from the element 51 (or deviated from the center of the respective exposed sides 71 and 74 in the direction opposite the element 51), thereby minimizing a negative effect on the element 51 during the soldering process.

Figure 10:
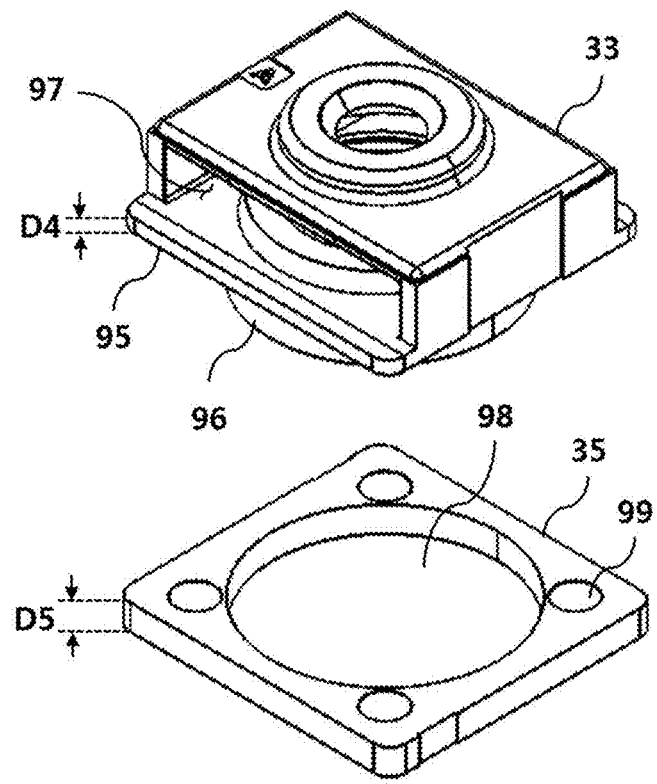
FIG. 10 is a view illustrating a holder and a middle base in more detail.
Figure 11:
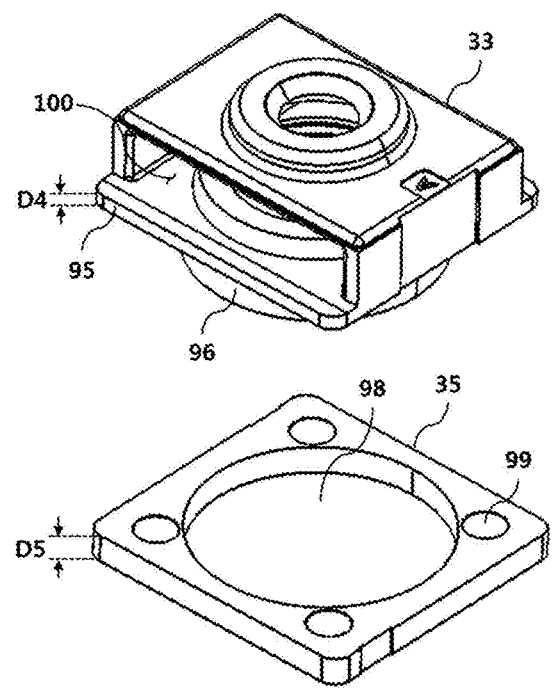
FIG. 11 is a view for explaining a holder and a middle base of an embodiment of the subject invention.

FIG. 10 is a first perspective view illustrating the holder and the middle base in more detail. FIG. 11 is a second perspective view illustrating the holder and the middle base in more detail.

Referring to FIGS. 10 and 11, FIG. 10 is a first perspective view illustrating the holder 33 and the middle base 35 in more detail, and a second perspective view of the holder 33 and the middle base 35 illustrated in FIG. 11 illustrates the holder 33 and the middle base 35 of FIG. 10 viewed from the opposite side (180 degrees).

The holder 33 includes the insertion hole into which the liquid lens unit 40 is inserted. The first perspective view illustrates a second opening 97 included in the insertion hole, and the second perspective view illustrates a first opening 100 included in the insertion hole. The first opening 100 may face the second opening 97 in the direction perpendicular to the optical-axis direction. The holder 33 may include a second side surface in which the second opening 97 is located, and a first side surface in which the first opening 100 is located.

As illustrated in FIG. 9, the second opening 97 may be disposed so as to be opened toward the second long side of the main board 39, and the first opening 100 may be disposed so as to be opened toward the first long side of the main board 39. In addition, the liquid lens 42 may also have a first side surface located at or along the first long side and a second side surface located at or along the second long side.

Thus, the first bending portion 64 of the common electrode connection substrate 44 may be disposed at the position corresponding to the center of the first side surface of the liquid lens 42, and the second bending portion 61 of the individual electrode connection substrate 41 may be disposed at the position corresponding to the center of the second side surface of the liquid lens 42.

In addition, the first lens unit 32 and the second lens unit 34 may be disposed in the holder 33, and the liquid lens 42 may be disposed between the first lens unit 32 and the second lens unit 34 so that at least a portion thereof may be disposed in the first opening 100 and the second opening 97 in the holder 33.

The liquid lens 42 may be inserted through at least one of the first opening 100 or the second opening 97, and a portion of the liquid lens 42 may protrude to the side surface of the holder 33. In addition, a portion of the liquid lens unit 40 including the liquid lens 42 may protrude to the side surface of the holder 33 through one of the first opening or the second opening. In an embodiment, the spacer 43 of the liquid lens unit 40, which surrounds the side surface of the liquid lens 42, may protrude outward from the holder 33 through one of the first opening or the second opening.

To allow the liquid lens 42 to be inserted through at least one of the first opening 100 or the second opening 97, the center thickness of the liquid lens 42 may be smaller than the size of the first opening 100 or the second opening 97 in the optical-axis direction.

As illustrated in FIG. 9, a virtual plane that passes through the first opening 100 and the second opening 97 may not overlap a plurality of circuit elements 51.

The holder 33 and the middle base 35 may be coupled to each other upon the implementation of first alignment and may be moved by a jig.

The holder 33 may be manufactured via an injection-molding process. Since the inner region of a second through-hole 96 in the holder 33 is cylindrical, the exterior of the second through-hole may be manufactured to have a cylindrical shape in order to increase the yield of the injection-molding process. In addition, a protruding portion 95 around the insertion hole, which supports the liquid lens unit 40, needs to have a minimum thickness D4 in order to reduce the thickness of the entire camera module 10-1. The insertion hole may include an upper plate, a lower plate facing the upper plate, and a first sidewall and a second sidewall, which interconnect the upper plate and the lower plate. The protruding portion 95 means the outer rim of the lower plate.

Thus, the protruding portion 95 may inevitably have the minimum thickness D4. When the middle base 35 is not coupled to the holder 33, the jig needs to grip the protruding portion 95 upon the implementation of first alignment. However, because the protruding portion 95 has an extremely small thickness D4, the jig may have difficulty in gripping the holder 33, and the holder 33 may be deviated depending on the direction or angle of movement of the jig, which makes normal implementation of first alignment impossible. In addition, since manufacturing tolerances may be increased as the thickness of the ribs of the holder 33 is increased, it is desirable to reduce the thickness of the ribs constituting the holder 33. Since the jig may have difficulty in gripping in the direction in which the insertion hole is disposed when the thickness of the ribs constituting the holder 33 is reduced, the middle base 35 may be added so as to be coupled to the holder 33 so that the jig may easily perform alignment of the holder 33 by supporting the middle base 35. It is noted that the middle base 35 may be omitted. The middle base 35 according to the embodiment may include an accommodating hole 98, which may accommodate the second through-hole 96 therein (i.e. into which a portion of the holder 33 is inserted), and a recessed portion 99 to which an adhesive (e.g. epoxy) may be applied. In addition, the outer shape of the middle base 35 may correspond to the lower shape of the insertion hole in the holder 33, and the outer diameter of the middle base 35 may be equal to or greater than the distance between opposite protruding portions 95 around the insertion hole. In other words, the length of the middle base 35 may be greater than the length of the holder 33 in the direction from the first opening 100 to the second opening 97.

In addition, the thickness D5 of the middle base 35 may be greater than the thickness D4 of the protruding portion 95, but may be smaller than the length of the second through-hole. The material of the middle base 35 may be liquid crystal polymer that is resistant to heat, but the scope of the disclosure is not limited thereto.

As in the camera module 10-1 according to the embodiment, when first alignment is performed in the state in which the middle base 35 is coupled to the holder 33, the jig may grip the middle base 35, rather than the protruding portion 95. Thus, because the middle base 35 has a thickness D5 sufficient to be stably gripped by the jig, gripping may be stably performed so that the holder 33 does not shake regardless of the direction or angle of movement of the jig, whereby first alignment may be performed normally. When there is no middle base 35, the jig may support the side surface of the holder 33.

Figure 12:
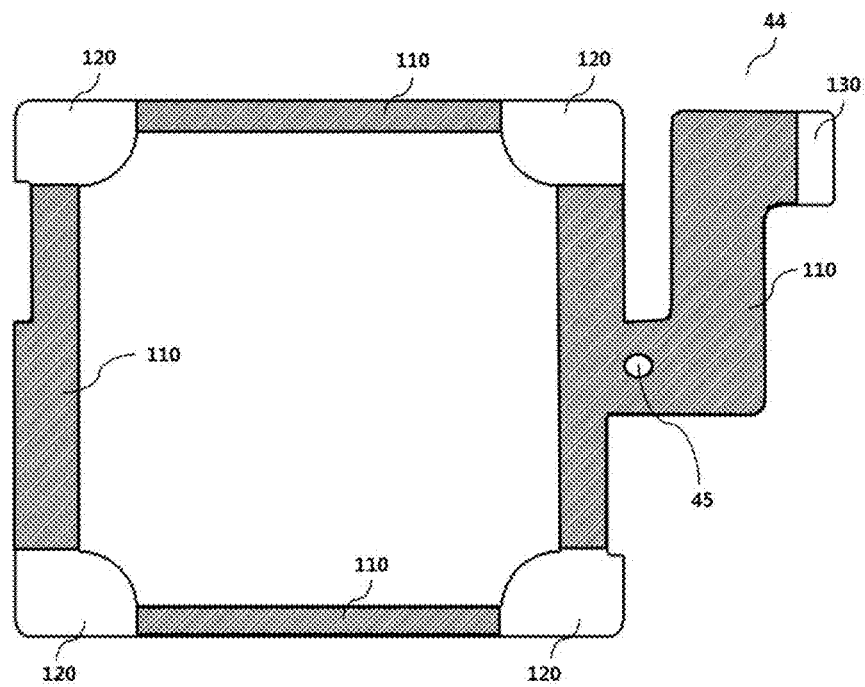
FIG. 12 is a view for explaining a common electrode connection substrate of an embodiment of the subject invention.

FIG. 12 is a view for explaining an embodiment of the common electrode connection substrate in more detail.

Referring to FIG. 12, the common electrode connection substrate 44, which electrically connects a common electrode of the liquid lens unit 40 to the main board 39, may be implemented as a single metal substrate.

The common electrode connection substrate 44 may be implemented as a metal plate, which includes a metal insulation layer 110 disposed on an area excluding a first pad 120, which is exposed at a position corresponding to an exposed pad at a position corresponding to a common electrode of the liquid lens 42, a second pad 130, which is exposed at a position corresponding to the common electrode pad of the main board 39, and the groove 45. The first pad 120 and the second pad 130 may respectively be an upper terminal and a lower terminal.

Here, the metal insulation layer 110 may be divided into a first metal insulation layer (the area at the right side of the groove 45), which corresponds to the outwardly exposed area of the liquid lens unit 40 coupled to the common electrode connection substrate 44, and a second metal insulation layer (the area at the left side of the groove 45), which corresponds to the area of the liquid lens unit 40 coupled to the common electrode connection substrate 44, which is located below the liquid lens 42. The first metal insulation layer may be disposed on the area that faces the inner side surface of the first cover 31, and the second metal insulation layer may be disposed so as to extend to the area located below the liquid lens 42. The first metal insulation layer and the second metal insulation layer may have different operations and effects.

The metal insulation layer 110 may be disposed on the top of a single metal substrate, which is in electrical conduction via a single node, by coating, plating, or deposition, and may include Parylene C. The common electrode connection substrate 44 may bend toward the common electrode pad of the main board 39 in the first bending area 64, which is guided by the groove 45, thereby being electrically connected to the main board 39. When the first cover 31 is mounted, the first cover 31 may be in contact with the individual electrode connection substrate 41 and the common electrode connection substrate 44. At this time, the first cover 31 may be formed of a conductive metal in consideration of the weight and strength thereof. When the first cover 31 is brought into contact with the individual electrode connection substrate 41 and the common electrode connection substrate 44, short-circuiting may occur between the individual electrode and the common electrode of the liquid lens 42. Due to this short-circuiting, the driving of the liquid lens 42 may be temporarily or continuously impossible.

However, the common electrode connection substrate 44 according to the embodiment may include the metal insulation layer 110 (more particularly, the first metal insulation layer) disposed on the area excluding the second pad 130 for connection with the main board 39, thereby inhibiting short-circuiting due to the first cover 31.

Figure 13:
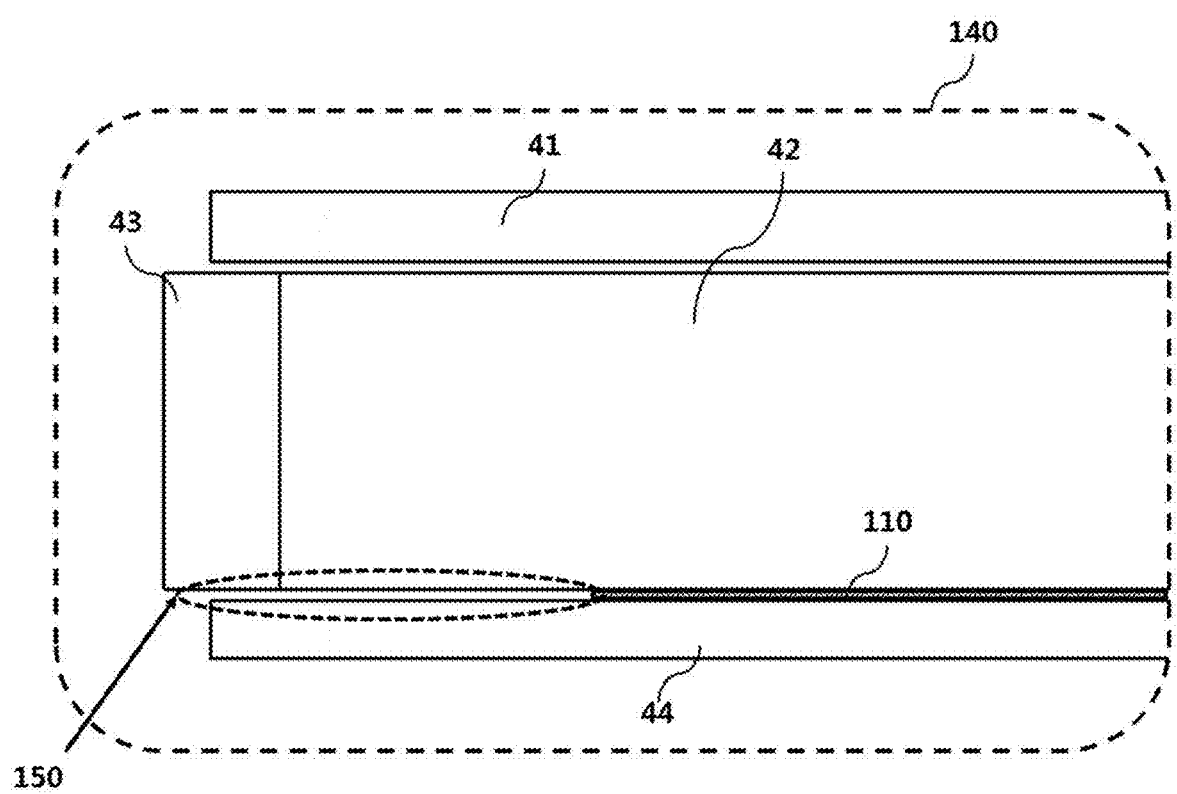
FIG. 13 is a view for explaining a liquid lens unit of an embodiment of the subject invention.

FIG. 13 is a view illustrating the cross section of a portion of the liquid lens unit including the common electrode connection substrate having the structure illustrated in FIG. 12.

Referring to FIG. 13, the liquid lens unit 40 may have a structure in which the individual electrode connection substrate 41, the liquid lens 42 coupled to or surrounded by the spacer 43, and the common electrode connection substrate 44 are stacked one above another. The spacer 43 may protrude outward from the individual electrode connection substrate 41 and the common electrode connection substrate 44 so as to be brought into contact with a gripper during an active alignment process.

Here, the common electrode connection substrate 44 may include the metal insulation layer 110 (more particularly, the second metal insulation layer), which corresponds to the area disposed below the liquid lens 42. Since the metal insulation layer 110 is disposed on the area excluding the first pad 120, which is exposed at a position corresponding to the exposed pad at a position corresponding to the common electrode of the liquid lens 42, a gap 150 may be formed between the exposed pad at a position corresponding to the common electrode of the liquid lens 42 and the first pad 120.

The exposed pad at the position corresponding to the common electrode of the liquid lens 42 and the first pad 120 may be electrically connected and bonded to each other via a conductive adhesive (e.g. Ag epoxy). Since the gap 150 is formed therebetween, it is possible to inhibit the conductive adhesive from leaking outward from the liquid lens unit 40 and to inhibit short-circuiting with another terminal (e.g. the individual electrode).

The gap 150 may provide a height difference equal to the thickness of the metal insulation layer 110, and for example, the thickness of the metal insulation layer 110 may range from 20 μm to 40 μm.

The above-described liquid lens may be included in the camera module. The camera module may include a lens assembly, which includes a liquid lens mounted in a housing and at least one solid lens disposed on the front surface (or, top surface) or the rear surface (or, bottom surface) of the liquid lens, an image sensor, which converts an optical signal transferred from the lens assembly to an electric signal, and a control circuit, which supplies a drive voltage to the liquid lens.

Although some embodiments have been described above, various other embodiments are possible. These embodiments may be combined in various forms so long as the technical ideas of the embodiments are not incompatible, and thus new embodiments may be realized therefrom.

For example, an optical device including the camera module, which includes the liquid lens described above, may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include the liquid lens. In addition, the optical device may be implemented in a portable device such as a smart phone, a laptop computer, or a tablet computer. Such an optical device may include a camera module, a display unit configured to output an image, and a body housing in which the camera module and the display unit are mounted. A communication module, which may communicate with other devices, may be mounted in the body housing of the optical device, and the optical device may further include a memory unit capable of storing data.

It will be apparent to those skilled in the art that the disclosure may be embodied into other particular forms within a range not deviating from the scope and essential features of the disclosure. Thus, the above detailed description should not be construed as being limitative in all terms, but should be considered as being illustrative. The scope of the disclosure should be determined by the rational analysis of the accompanying claims, and all changes within the equivalent range of the disclosure are included in the scope of the disclosure.

MODE FOR INVENTION

As described above, a related description has sufficiently been discussed in the above "Best Mode" for implementation of the embodiments.

INDUSTRIAL APPLICABILITY

A camera module and an optical device, which include a liquid lens according to embodiments, may be used in camera/video devices, telescopic devices, microscopic devices, an interferometer, a photometer, a polarimeter, a spectrometer, a reflectometer, an auto-collimator, a lens-meter, a smart phone, a laptop computer, or a tablet computer.

The invention claimed is:

1. A camera module comprising:
   a board having a plurality of circuit elements and an image sensor;
   a holder disposed on the board and comprising a side wall having a hole;
   a first lens unit disposed in the holder; and
   a focus adjustable lens unit disposed in the holder, at least a portion of the focus adjustable lens unit disposed in the hole,
   wherein the focus adjustable lens unit is disposed on the first lens unit,
   wherein the board comprises a first long side, a second long side opposite the first long side, and a short side connecting the first long side and the second long side, and
   wherein the hole is opened toward the first long side of the board.

2. The camera module according to claim 1, comprising:
   a second lens unit disposed in the holder,
   wherein the focus adjustable lens unit is disposed between the first lens unit and the second lens unit.

3. The camera module according to claim 1,
   wherein the hole comprises a first hole and a second hole, and
   wherein the second hole faces the first hole in a first direction perpendicular to an optical axis direction.

4. The camera module according to claim 3,
   wherein the focus adjustable lens unit is disposed between the first hole and the second hole.

5. The camera module according to claim 3,
   wherein the side wall comprises a first side wall and a second side wall disposed opposite to the first side wall,
   wherein the first side wall has the first hole, and
   wherein the second side wall has the second hole.

6. The camera module according to claim 4, wherein a part of the focus adjustable lens unit is disposed in at least one of the first hole and the second hole.

7. The camera module according to claim 6, wherein a part of the focus adjustable lens unit protrudes outward from the holder through at least one of the first hole and the second hole.

8. The camera module according to claim 1,
   wherein the focus adjustable lens unit comprises a first material and a second material different from the first material.

9. The camera module according to claim 8,
   wherein the first material comprises water and the second material comprises oil.

10. The camera module according to claim 3, wherein the first hole is opened toward the first long side of the board, and wherein the second hole is opened toward the second long side of the board.

11. The camera module according to claim 5, wherein the focus adjustable lens unit is inserted through the first hole and the second hole, wherein a first portion of the focus adjustable lens unit protrudes out from the first side wall, and wherein a second portion of the focus adjustable lens unit protrudes out from the second side wall.

12. The camera module according to claim 1, wherein the focus adjustable lens unit has a center thickness smaller than a size of the first opening in the holder, in a second direction parallel to the optical axis of the focus adjustable lens unit.

13. The camera module according to claim 1, wherein the circuit elements do not overlap a virtual plane, which passes through the first opening and is parallel to an upper surface of the board, in a second direction parallel to the optical axis of the focus adjustable lens unit.

14. The camera module according to claim 1, wherein the focus adjustable lens unit comprises a focus adjustable lens, and wherein the focus adjustable lens comprises:
   a first plate comprising a cavity in which a conductive liquid and a non-conductive liquid are disposed;
   an individual electrode disposed on one surface of the first plate; and
   a common electrode disposed on another surface of the first plate.

15. The camera module according to claim 8, wherein the focus adjustable lens unit comprises:
   a first connection substrate disposed on the focus adjustable lens and configured to electrically connect the common electrode and the board;
   a second connection substrate disposed on the focus adjustable lens and configured to electrically connect the individual electrode and the board; and
   a first side surface located at the first long side of the board and a second side surface located at the second long side of the board, and
   wherein the first connection substrate comprises a first bending portion, which is connected to the common electrode, bends toward the board, and is disposed at a first position corresponding to a center of the first side surface of the focus adjustable lens unit.

16. The camera module according to claim 9, wherein the second connection substrate comprises a second bending portion, which is connected to the individual electrode, bends toward the board, and is disposed at a position corresponding to a center of the second side surface of the focus adjustable lens unit.

17. The camera module according to claim 10, comprising a first pad portion configured to be electrically connected to the first connection substrate, wherein the first pad portion is disposed on the board at a second position corresponding to the center of the first side surface of the focus adjustable lens unit and extends away from the circuit elements.

18. The camera module according to claim 9, comprising an insulation material and a cover covering an upper surface and a side surface of the holder,
   wherein the first connection substrate is a metal plate,
   wherein the metal plate comprises:
      a lower terminal configured to be electrically connected to the board; and
      an upper terminal configured to be electrically connected to the focus adjustable lens, and
   wherein the insulation material is disposed on the metal plate in an area that faces an inner side surface of the cover.

19. A camera module, comprising:
   a board having a plurality of circuit elements and an image sensor;
   a holder disposed on the board and comprising a side wall having a hole;
   a first lens unit disposed in the holder; and
   a focus adjustable lens unit disposed on the first lens unit,
   wherein the focus adjustable lens unit is inserted through the hole and overlapped with the hole in a direction perpendicular to an optical axis,
   wherein the board comprises a first long side, a second long side opposite the first long side, and a short side connecting the first long side and the second long side, and
   wherein the hole is opened toward the first long side of the board.

20. A camera module, comprising:
   a board having a plurality of circuit elements and an image sensor;
   a holder disposed on the board and comprising a side wall having a hole;
   a first lens unit disposed in the holder;
   a second lens unit disposed in the holder;
   an interface variable lens disposed between the first lens unit and the second lens unit; and
   a board disposed under the holder, a plurality of circuit elements and an image sensor being disposed on the board,
   wherein the interface variable lens comprises a first material, a second material on the first material and an interface between the first material and the second material,
   wherein a part of the interface variable lens is disposed in the hole, and
   wherein the board comprises a first long side, a second long side opposite the first long side, and a short side connecting the first long side and the second long side, and
   wherein the hole is opened toward the first long side of the board.

* * * * *